(12) United States Patent
Acosta

(10) Patent No.: US 7,393,133 B2
(45) Date of Patent: Jul. 1, 2008

(54) SOIL MIXER WITH SCALLOPED CYLINDER

(76) Inventor: Ernesto Acosta, 3370 SW. 143 Pl., Miami, FL (US) 33175

( * ) Notice: Subject to any disclaimer, the term of this patent is extended or adjusted under 35 U.S.C. 154(b) by 92 days.

(21) Appl. No.: 11/633,947

(22) Filed: Dec. 5, 2006

(65) Prior Publication Data

US 2008/0130403 A1    Jun. 5, 2008

(51) Int. Cl.
    *B01F 7/12* (2006.01)
(52) U.S. Cl. ................. 366/299; 366/305; 241/101.8
(58) Field of Classification Search ......... 366/64–67, 366/96–99, 292, 297–300, 302, 305, 242–343; 241/101.8; 119/902
    See application file for complete search history.

(56) References Cited

U.S. PATENT DOCUMENTS

| 4,712,919 A | 12/1987 | Bouldin |
| 5,005,980 A | 4/1991 | Zimmerman |
| 5,361,711 A | 11/1994 | Beyerl |
| 5,599,095 A | 2/1997 | Elkin |
| 6,595,446 B1 | 7/2003 | Kamoshida et al. |
| 6,971,783 B2 | 12/2005 | Owen |

FOREIGN PATENT DOCUMENTS

WO    WO 8001993 A1    10/1980

*Primary Examiner*—Charles E Cooley
(74) *Attorney, Agent, or Firm*—Ruben Alcoba; Craig Kirsch

(57) ABSTRACT

The invention is a device for mixing nursery dirt, peat moss and wood shavings into a marketable soil mixture. The device is made of a housing, a conveyor, a motor, a scalloped cylinder, a metal blade, at least seven metal cylinders, sprockets that turn the scalloped cylinder and at least three of the metal cylinders, a belt, and a chain.

4 Claims, 6 Drawing Sheets

SOIL MIXER WITH SCALLOPED CYLINDER

BACKGROUND

In the nursery business there is a need for a soil mixture that is lightweight, porous and water retentive. An ideal soil mixture is the combination of nursery dirt, wood shavings and peat moss. The problem with the above combination is that some of the wood shavings are larger than desired for the nursery business. The inventor realized that the elements of this mixture could not be greater than a certain size to be marketable.

For the mixture to be marketable, each element of the mixture has to have no greater than a certain size. The inventor therefore had to cut/shred the wood shavings to a size no greater than a half an inch prior to combining the particulate together. This proved to be time consuming and commercially not feasible.

This is when the inventor realized that he had to devise a device that could cut and shred the elements to a certain size in the most efficient matter. He decided that the device had to receive a large quantity of the mixture prior to the cutting and the shredding. The device should also mix the mixture while cutting and shredding the mixture to the certain size required.

An object of the current invention is to cut and shred each element of the soil mixture to no greater than half an inch.

A further object of this invention is to mix the elements of the soil mixture into a homogeneous mixture.

SUMMARY

The present invention is directed to a soil mixer that reduces the elements of a soil mixture to a size that is no greater than half an inch. The soil mixture mixed in the soil mixer is a combination of wood shavings, nursery dirt and peat moss. The mixer mixes the elements of the soil mixture into a homogeneous mixture.

A soil mixer having features of the present invention comprises a housing attached to a platform, a scalloped cylinder centrally attached to the housing, the scalloped cylinder having scalloped cylinder sprockets on its ends, seven metal cylinders attached to the housing along the periphery of the scalloped cylinder in an arced manner, a motor attached to one of the scalloped cylinder sprockets, a chain attached to the other scalloped cylinder sprocket and to three of the metal cylinders, and a metal blade attached to the housing at a location described below.

The housing has six sides. The top side of the housing is funnel shaped. The bottom side of the housing is hollow. The front side of the housing defines a centrally located aperture. The rear side of the housing defines a second centrally located aperture and seven lower located apertures that are positioned in an arced manner. The right side of the housing defines a slit that runs along a raised structure of the housing, wherein the slit and the raised structure run parallel to the right side of the housing, the slit is positioned to be approximately the same distance from the bottom of the housing as the centrally located apertures of the front and rear sides of the housing. The right side of the housing further defines at least one right side window aperture having at least one first door attached to the right side of the housing at a location adjacent to the right side of the window aperture. The left side of the housing defines at least one left side window aperture having at least one second door attached to the left side of the housing at a location adjacent to the left side window aperture.

The platform defines a platform aperture. The housing attaches to the platform so that the hollow end of the housing is directly above platform aperture of the platform.

The scalloped cylinder has two ends and each end has a scalloped cylinder sprocket centrally attached to the scalloped cylinder. The scalloped cylinder is housed within the housing and the scalloped cylinder sprockets are positioned outside of the front and rear ends of the housing and then passed through the centrally located apertures of the housing and then attached to the ends of the scalloped cylinder.

Each metal cylinder has two ends. The first end of each metal cylinder attaches to the front of the housing. The metal cylinders are attached to the front side of the housing in an arced configuration. The arced configuration follows the circumference of the scalloped cylinder at a location that is adjacent to the bottom of the housing. Three of the metal cylinders have metal cylinder sprockets attached to the ends of the metal cylinders not attached to the front side of the housing. The metal cylinder sprockets are located outside of the rear side of the housing and are passed through three of the lower located apertures of the rear side of the housing. The remaining metal cylinders are passed through the remaining lower apertures and are attached to the rear side of the housing. The metal cylinders are arranged in an alternative manner and spaced half an inch apart. The metal cylinders are arranged so that the three metal cylinders having sprockets are placed between the metal cylinders not having sprockets. All of the metal cylinders have bearings on both ends, and this allows the metal cylinders to turn freely.

The motor has at least one motor sprocket and a belt. The belt attaches to the scalloped cylinder sprocket located at the front side of the housing and to the motor sprocket.

The chain attaches to the scalloped cylinder sprocket located at the rear side of the housing and the metal cylinder sprockets.

The metal blade is passed through the slit of the housing and attaches to the raised structure of the right side of the housing. The blade is positioned at a downward angle and the tip of the blade is positioned to be half an inch from the periphery of the scalloped cylinder.

DRAWINGS

These and other features, aspects, and advantages of the present invention will become better understood with regard to the following description, appended claims, and drawings where:

DESCRIPTION

Figure 1:
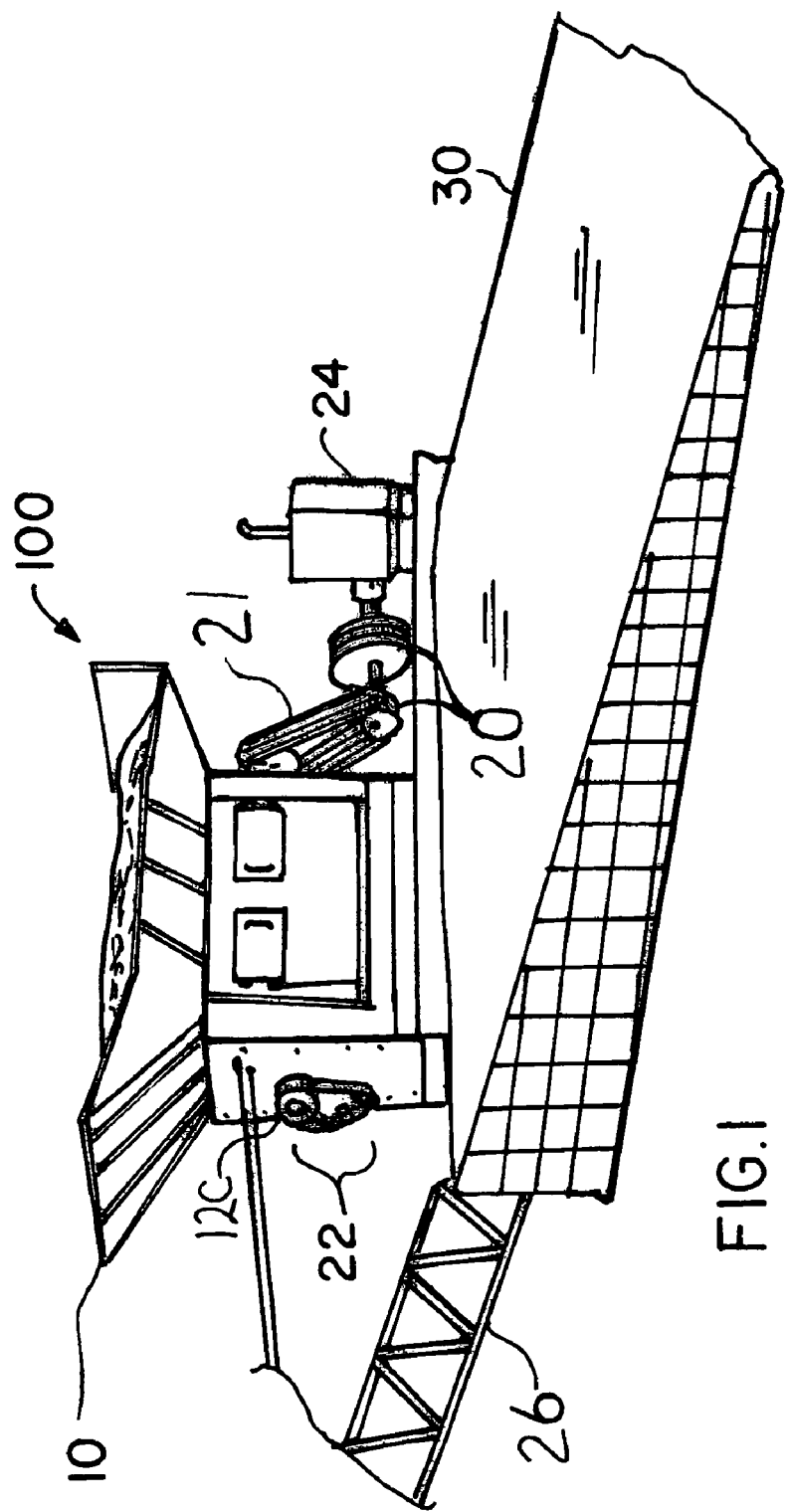
FIG. 1 shows a perspective view of the soil mixer of the present invention.
Figure 2:
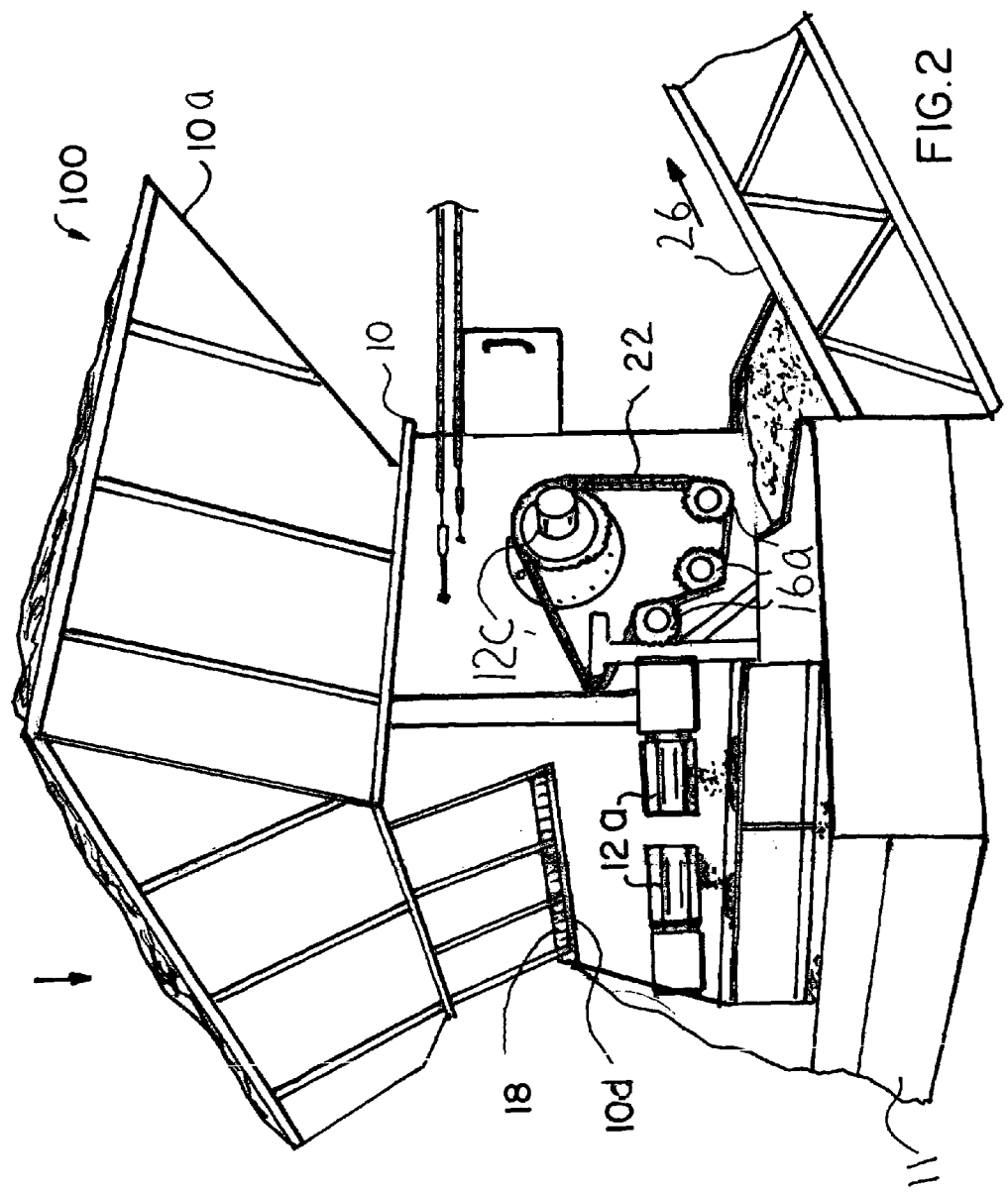
FIG. 2 shows a perspective of the present invention showing the right side and the rear of the housing.
Figure 3:
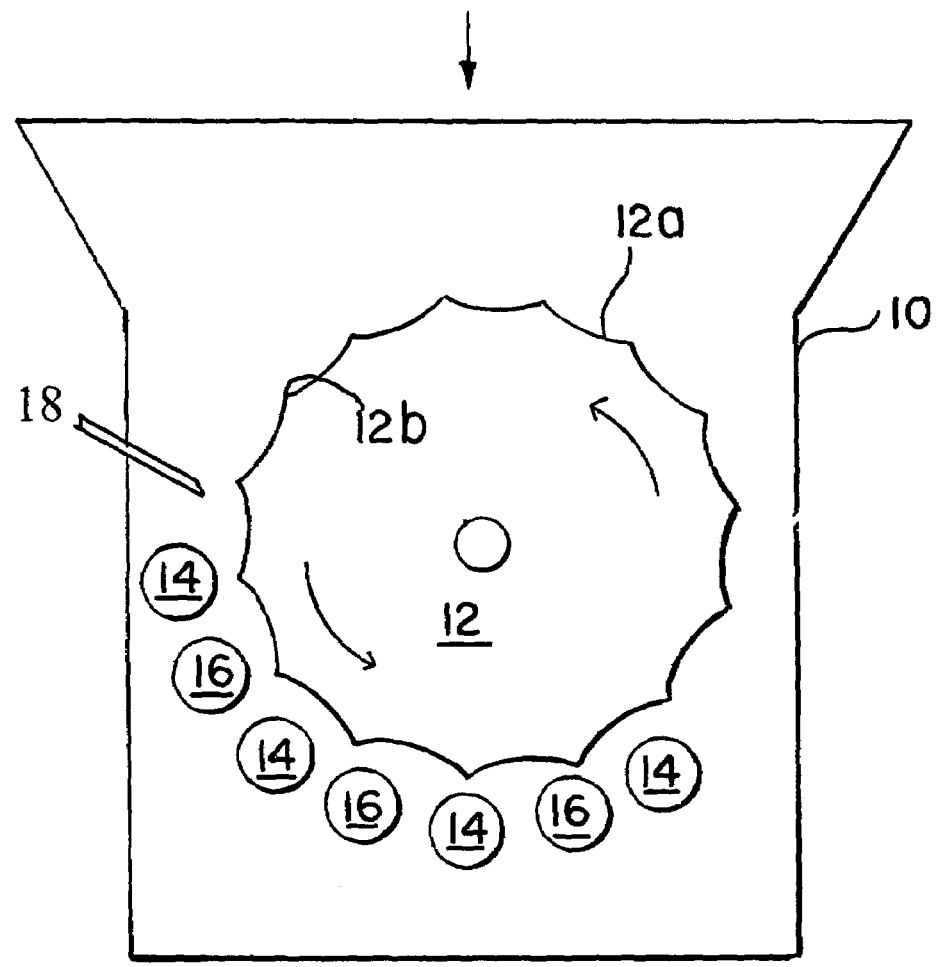
FIG. 3 shows a rear view of the inside of the housing, wherein the position of the blade, the scalloped cylinder and the metal cylinders are shown.
Figure 4:
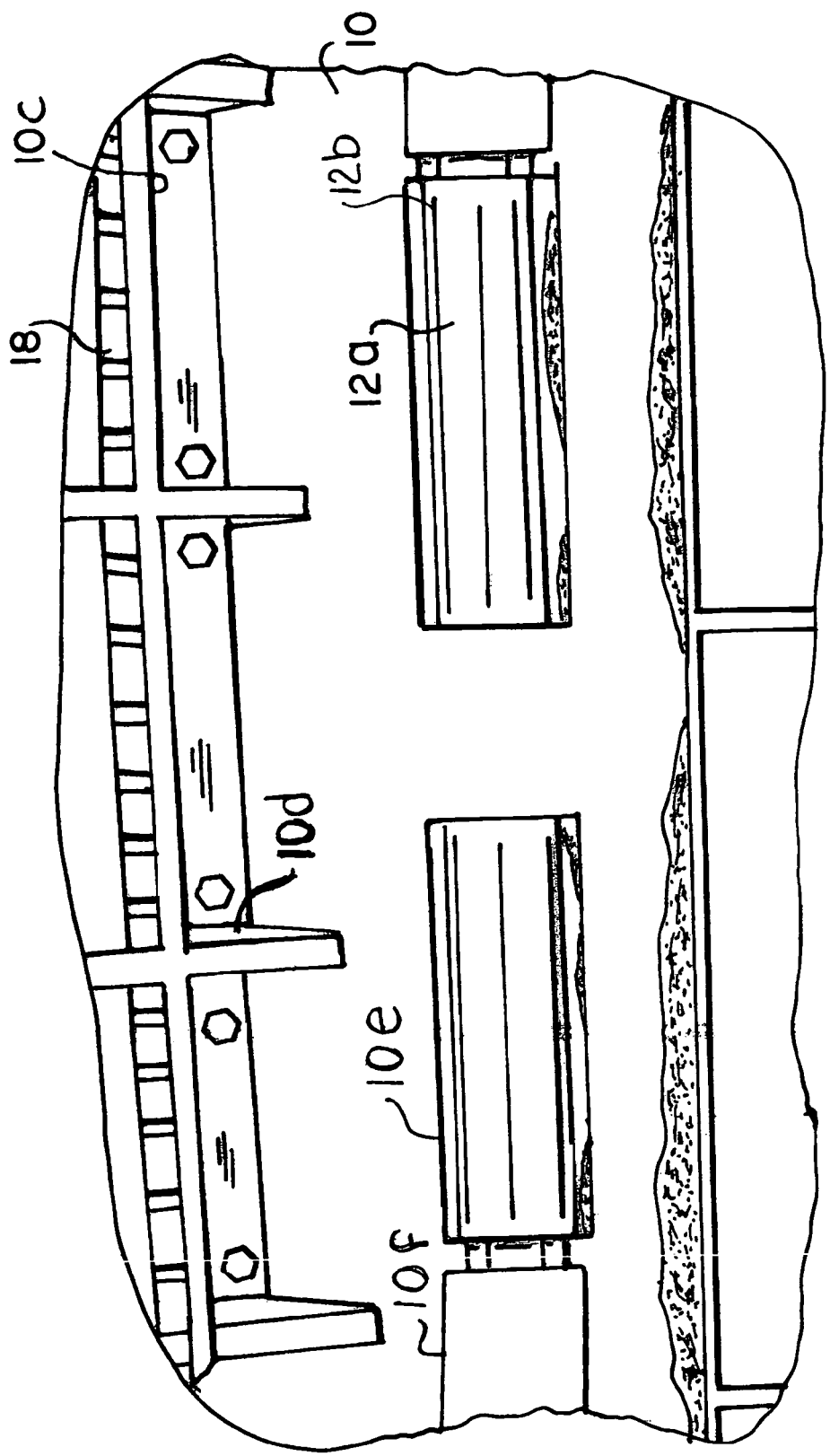
FIG. 4 shows a right side view of the housing.
Figure 5:
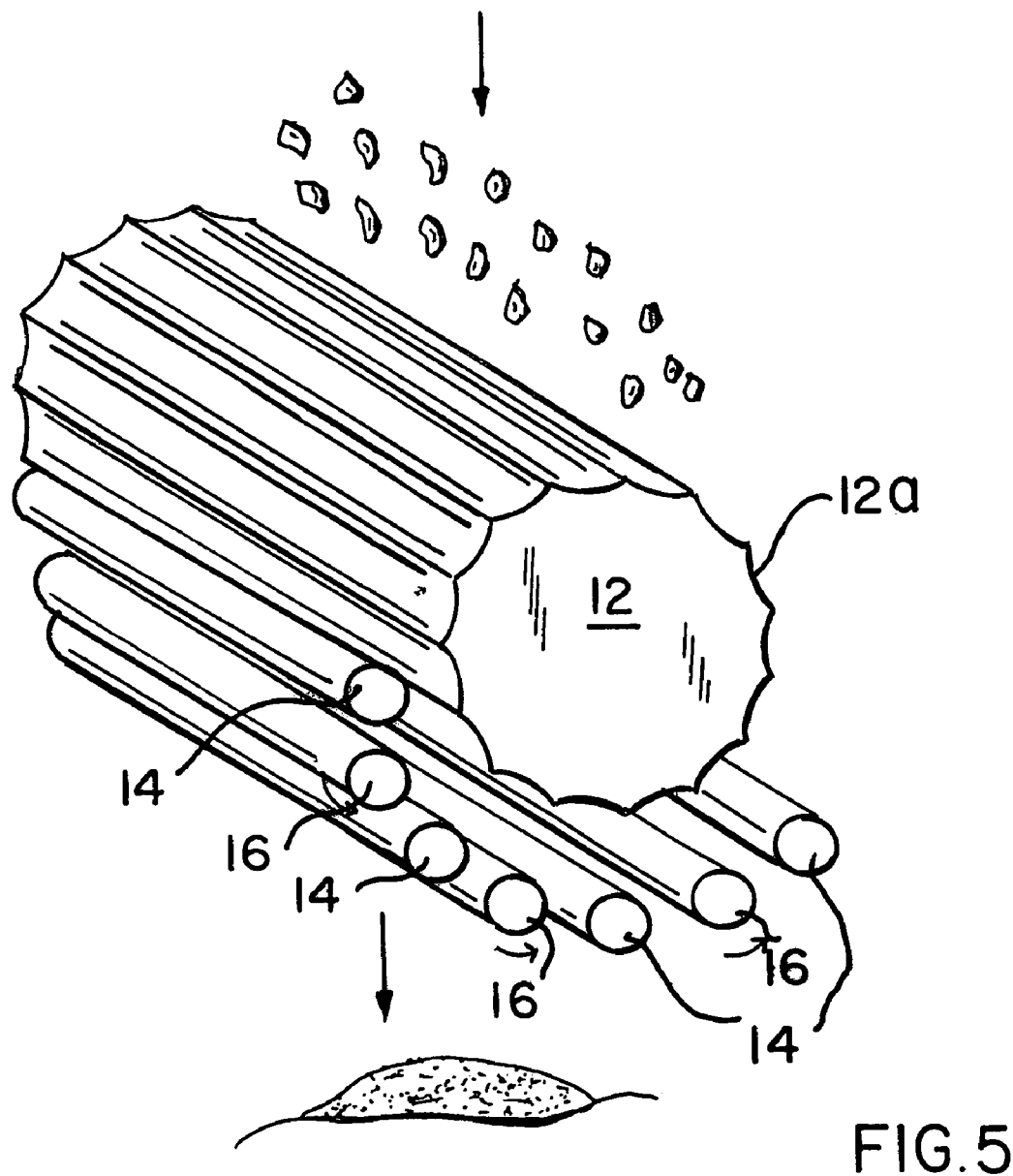
FIG. 5 shows the relative positioning of the scalloped cylinder and the metal cylinders.
Figure 6:
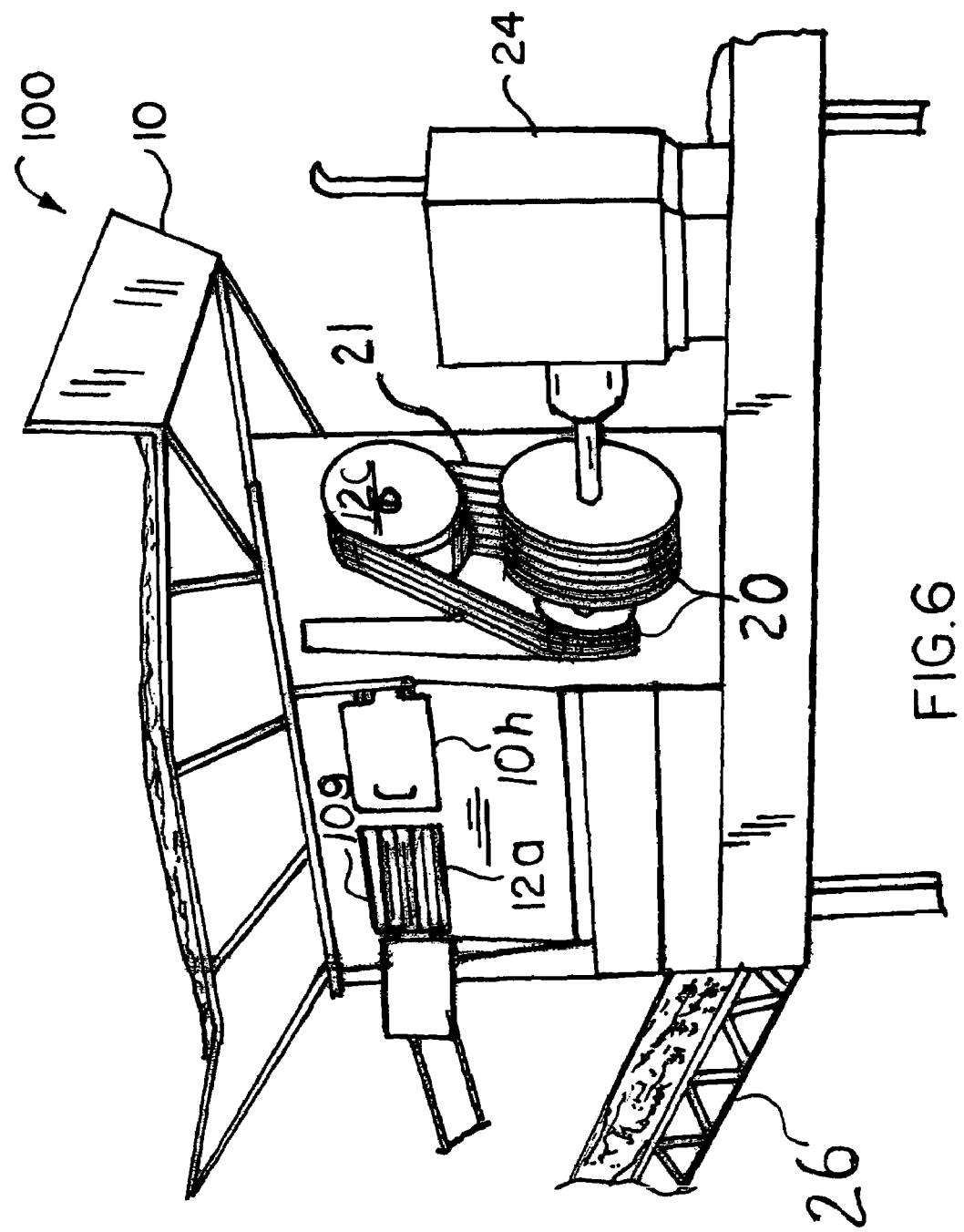
FIG. 6 shows a left sided perspective view of the soil mixer.

As seen in FIGS. 2, 3, 4 and 6, a soil mixer 100 for mixing nursery dirt, wood shavings and peat moss into a mixture, comprising a housing 10 having six sides, wherein the top side 10a is funnel shaped, the bottom side 10b is hollow, the front side defines a centrally located aperture, the rear side defines a second centrally located aperture and seven lower located apertures that are positioned in an arced manner, the right side defines a slit 10c that runs along a raised structure 10d of the housing 10, wherein the slit 10c and the raised structure 10d run parallel to the right side of the housing 10, the slit 10c is positioned to be approximately the same distance from the bottom of the housing 10b as the centrally located apertures of the front and rear sides of the housing 10, the right side of the housing further defines at least one right side window aperture 10e having at least one first door 10f attached to the right side of the housing at a location adjacent to the right side of the window aperture 10e, and the left side of the housing 10 defines at least one left side window aperture 10g having at least one second door 10h attached to the left side of the housing 10 at a location adjacent to the left side window aperture 10g, as seen in FIG. 6, a platform 11, the platform 11 defines a platform aperture, the housing 10 attaches to the platform 11 so that the hollow end of the housing 10b is directly above platform aperture of the platform 11, as seen in FIGS. 3, 5 and 6, a scalloped cylinder 12, the scalloped cylinder 12 has two ends and each end has a scalloped cylinder sprocket 12c centrally attached to the scalloped cylinder 12, the scalloped cylinder 12 is housed within the housing 10 and the scalloped cylinder sprockets 12c are positioned outside of the front and rear ends of the housing 10 and then passed through the centrally located apertures of the housing 10 and then attached to the ends of the scalloped cylinder 12, as seen in FIGS. 2, 3 and 5, seven metal cylinders 14/16, each cylinder 14/16 has two ends, the first end of each cylinder attaches to the front of the housing 10, the metal cylinders attach to the front side of the housing 10 in an arced configuration, the arced configuration follows the circumference of the scalloped cylinder 12 at a location that is adjacent to the bottom of the housing 10b, three of the metal cylinders 16 have metal cylinder sprockets 16a that attach to the end of the three metal cylinders 16 not attached to the front side of the housing 10, the metal cylinder sprockets 16a are located outside of the rear side of the housing 10 and are passed through three of the lower located apertures of the rear side of the housing 10, the remaining metal cylinders 14 are passed through the remaining lower located apertures of the rear side of the housing and are attached to the rear side of the housing 10, the metal cylinders 14/16 are arranged in an alternative manner and spaced a half inch apart, the metal cylinders 14/16 are arranged so that the three metal cylinders 16 having sprockets 16a are placed between the metal cylinders 14 not having sprockets, all metal cylinders 14/16 contain bearings on both ends to allow them to turn freely, as seen in FIGS. 1 and 6, a motor 24 having at least one motor sprocket 20 and a belt 21, the belt 21 attaches to the scalloped cylinder sprocket 12c located in the front side of the housing 10 and the motor sprocket 20, as seen in FIGS. 1 and 2, a chain 22 attaches to the scalloped cylinder sprocket 12c located in the rear side of the housing 10 and the metal cylinder sprockets 16a, and as seen in FIGS. 2 and 3, at least one metal blade 18 is passed through the slit 10c of the housing 10 and attaches to the raised structure 10d of the right side of the housing 10, the blade 18 is positioned in a downward angle and the tip of the blade 18 is positioned to be a half an inch from the periphery of the scalloped cylinder 12b.

In another embodiment of the present invention, as seen in FIGS. 1, 2 and 6, the soil mixer 100 can further comprise of a conveyor 26 positioned below the platform 11.

In yet another embodiment of the present invention, as seen in FIG. 1, the soil mixer 100 might further comprise of a ramp 30 that is adjacent to one of the sides of the platform 11 that is used to load the soil mixer 100.

The present invention is to be manufactured using heavy duty materials known in the art, e.g. steel.

The scallops 12a of the scalloped cylinder 12 have a depth of no more that 3 inches and a width of no less that 3 inches. The soil mixer 100 functions by spinning the scalloped cylinder 12 repeatedly until the mixture is cut and shredded to the required size by the blade. The distance between the metal cylinders 14/16, half an inch, determine when the mixture passes through to the conveyor 26.

The window apertures 10e/10g of the present invention allow the user of the present invention to clear jams caused by the accumulation of the mixture.

The reason that three of the metal cylinders 16 are motorized is because the inventor realized that if the three metal cylinders 16 where not forced to spin, the soil mixer 100 would jam up after a short period of time because of mixture accumulation.

The motor 24 used in the present invention should be comparable to any motor used to crush rocks.

The present invention is used by loading the soil mixer 100 with a loader with a pre-mix of wood shavings, nursery dirt and peat moss, then having the soil mixer's scalloped cylinder 12 spin the mixture until the mixture has passed between the openings of the metal cylinders 14/16.

Although the present invention has been described in considerable detail with reference to certain preferred versions thereof, other versions are possible. Therefore the spirit and the scope of the claims should not be limited to the description of the preferred versions contained herein.

What is claimed is:

1. A soil mixer for mixing nursery dirt, wood shavings and peat moss into a mixture, comprising:

a housing having six sides, wherein the top side is funnel shaped, the bottom side is hollow, the front side defines a centrally located aperture, the rear side defines a second centrally located aperture and seven lower located apertures that are positioned in an arced manner, the right side defines a slit that runs along a raised structure of the housing, wherein the slit and the raised structure run parallel to the right side of the housing, the slit is positioned to be approximately the same distance from the bottom of the housing as the centrally located apertures of the front and rear sides of the housing, the right side of the housing further defines at least one right side window aperture having at least one first door attached to the right side of the housing at a location adjacent to the right side of the window aperture, and the left side of the housing defines at least one left side window aperture having at least one second door attached to the left side of the housing at a location adjacent to the left side window aperture;

a platform, the platform defines a platform aperture, the housing attaches to the platform so that the hollow end of the housing is directly above platform aperture of the platform;

a scalloped cylinder, the scalloped cylinder having two ends and each end having a scalloped cylinder sprocket centrally attached to the scalloped cylinder, the scalloped cylinder is housed within the housing and the scalloped cylinder sprockets are positioned outside of the front and rear ends of the housing and then passed through the centrally located apertures of the housing and then attached to the ends of the scalloped cylinder;

seven metal cylinders, each cylinder has two ends, the first end of each cylinder attaches to the front of the housing, the metal cylinders attach to the front side of the housing in an arced configuration, the arced configuration follows the circumference of the scalloped cylinder at a location that is adjacent to the bottom of the housing, three of the metal cylinders have metal cylinder sprockets that attach to the end of the metal cylinders not attached to the front side of the housing, the metal cylinder sprockets are located outside of the rear side of the housing and are passed through three of the lower located apertures of the rear side of the housing, the remaining metal cylinders are passed through the remaining lower located apertures of the rear side of the housing and are attached to the rear side of the housing, the metal cylinders are arranged in an alternative manner and spaced a half inch apart, the metal cylinders are arranged so that the three metal cylinders having sprockets are placed between the metal cylinders not having sprockets, all metal cylinders contain bearings on both ends to allow them to turn freely;

a motor having at least one motor sprocket and a belt, the belt attaches to the scalloped cylinder sprocket located in the front side of the housing and the motor sprocket;

a chain that attaches to the scalloped cylinder sprocket located in the rear side of the housing and the metal cylinder sprockets; and at least one metal blade that is passed through the slit of the housing and attached to the raised structure of the right side of the housing, the blade is positioned in a downward angle and the tip of the blade is positioned to be a half an inch from the periphery of the scalloped cylinder.

2. The soil mixer of claim 1, further comprising a conveyor that is placed below the platform.

3. The soil mixer of claim 2, further comprising a ramp that is positioned to the left side of the housing.

4. The soil mixer of claim 1, further comprising a ramp that is positioned to the left side of the housing.

* * * * *